United States Patent
Sellen et al.

(10) Patent No.: US 10,557,181 B2
(45) Date of Patent: Feb. 11, 2020

(54) VALVE BODY TREATED BY AUTOFRETTAGE

(71) Applicant: Luxembourg Patent Company S.A., Lintgen (LU)

(72) Inventors: Stephan Sellen, Wehingen (DE); Philippe Schmitz, Steinsel (LU)

(73) Assignee: Luxembourg Patent Company S.A., Lintgen (LU)

( * ) Notice: Subject to any disclaimer, the term of this patent is extended or adjusted under 35 U.S.C. 154(b) by 103 days.

(21) Appl. No.: 15/114,310

(22) PCT Filed: Jan. 27, 2015

(86) PCT No.: PCT/EP2015/051623
§ 371 (c)(1),
(2) Date: Jul. 26, 2016

(87) PCT Pub. No.: WO2015/113975
PCT Pub. Date: Aug. 6, 2015

(65) Prior Publication Data
US 2017/0240984 A1   Aug. 24, 2017

(30) Foreign Application Priority Data

Jan. 28, 2014   (LU) .......................... 92362

(51) Int. Cl.
*C21D 7/12*   (2006.01)
*C21D 7/04*   (2006.01)
(Continued)

(52) U.S. Cl.
CPC ................. *C21D 7/12* (2013.01); *C21D 7/04* (2013.01); *C22F 1/05* (2013.01); *F16K 27/06* (2013.01);
(Continued)

(58) Field of Classification Search
CPC ......... Y10T 29/49405; Y10T 29/49412; Y10T 29/49423; Y10T 29/49805;
(Continued)

(56) References Cited

U.S. PATENT DOCUMENTS 4,354,371 A * 10/1982 Johnson .................... B23P 9/00
72/53
5,605,449 A *  2/1997 Reed .................... F04B 53/1022
137/454.4
(Continued)

FOREIGN PATENT DOCUMENTS

DE   102009000538 A1   8/2010
EP        2532473 A1   12/2012
(Continued)

OTHER PUBLICATIONS

International Preliminary Report on Patentability dated Aug. 2, 2016 for parent PCT application PCT/EP2015/051623.
(Continued)

*Primary Examiner* — Reinaldo Sanchez-Medina
*Assistant Examiner* — Hailey K. Do
(74) *Attorney, Agent, or Firm* — James E. Walton (57) ABSTRACT

The invention is directed to a method for improving the fatigue behavior of the body (2) of a gas valve, the body comprising at least two bores (4, 10) and at least one bore intersection (20) defining an internal volume; wherein the method comprises the following step: subjecting the internal volume to an autofrettage by applying a pressure of comprised between 100 MPa and 500 MPa by means of a liquid. 10. The invention is also directed to a gas valve body (2) comprising at least two bores (4, 10) and at least one bore intersection (20) defining an internal volume with an internal
(Continued)

wall; wherein the internal wall is treated by autofrettage resulting in compressive stresses at the intersection or at least one of the intersections.

17 Claims, 4 Drawing Sheets

(51) Int. Cl.
*F16K 27/06* (2006.01)
*C22F 1/05* (2006.01)

(52) U.S. Cl.
CPC ........... *F02M 2200/8053* (2013.01); *F02M 2200/8076* (2013.01); *F02M 2200/9061* (2013.01); *Y10T 29/49863* (2015.01)

(58) Field of Classification Search
CPC ... Y10T 29/49863; F16L 15/006; F16L 15/06; F16L 15/02; F16L 55/1108; F16L 58/182; C21D 7/12; C21D 7/08; C21D 7/10; C21D 7/04; C21D 7/06; F02M 2200/8053; F02M 2200/8076; F02M 2200/9061
See application file for complete search history.

(56) References Cited

U.S. PATENT DOCUMENTS

| | | | | |
|---|---|---|---|---|
| 7,431,781 B2* | 10/2008 | Usui | ................... | F02M 55/004 148/590ke |
| 8,099,850 B2* | 1/2012 | Bitto | ................... | G01F 1/8409 29/452 |
| 2008/0000065 A1* | 1/2008 | Ganguly | ............... | F04B 53/162 29/421.1 |
| 2011/0255993 A1* | 10/2011 | Ochoa | ....................... | F04B 1/02 417/53 |
| 2014/0291048 A1* | 10/2014 | Morales | ................... | F17C 1/14 180/69.5 |

FOREIGN PATENT DOCUMENTS

| | | |
|---|---|---|
| EP | 2548984 A1 | 1/2013 |
| FR | 1176969 A | 4/1959 |
| JP | 10318081 | 12/1998 |

OTHER PUBLICATIONS

Kohlenbecker, M.J. and Roos, E. (2013), Stabiiitat von Druckeigenspannungen unter zyklischer Beanspruchung fur autifrettierte Bauteile aus Aluminium. Mat.-wiss u. Werkstofftech., 44: 813-818.

Search Report dated May 8, 2015 for parent PCT application PCT/EP2015/051623.

Kohlenbecker,. M.J. and Roos, E. (2013), Stabilitat von Druckeigenspannungen unter zyklischer Beanspruchung fur autifrettierte Bauteile aus Aluminium. Mat.-wiss u. Werkstofftech., 44: 813-818.

* cited by examiner

VALVE BODY TREATED BY AUTOFRETTAGE

TECHNICAL FIELD

The invention is directed to the field of valves, more particularly gas valves and even more particularly to valves for gas cylinders. The invention is directed among others to such valves applied to hydrogen applications.

BACKGROUND ART

For hydrogen-powered vehicle applications, the COMMISSION REGULATION (EU) No 406/2010 of 26 Apr. 2010 and implementing Regulation (EC) No 79/2009 of the European Parliament and of the Council on type-approval of hydrogen-powered motor vehicles have provisions that the components of the hydrogen supply of the vehicles must satisfy different tests. The valves must among others satisfy cyclic pressure tests. It is therefore wished that the valves for such applications can withstand a maximum static test pressure of 105 MPa (1050 bar) and a cyclic hydraulic pressure test of N=150 000 cycles with a cyclic pressure loading of 87.5 MPa and a nearly stress ratio R=min stress/max stress=0.

Prior art patent document published EP 2 548 984 A1 addresses the problem of a 6000 series aluminum alloy material that has to show a satisfactory resistance to hydrogen embrittlement. The material is intended to be used as material of storage container for high-pressure hydrogen gas. To that end this document discloses a specific composition of an aluminum alloy material. The behavior of this material with regard to hydrogen embrittlement is interesting. The resistance to cyclic pressure tests is however not sufficient for gas valve which comprises bore intersections with possible sharp edges which favor stress concentrations and the formation of cracks.

Prior art patent document published FR 1 176 960 is directed to a valve for very high pressures, i.e. up to and above 3 000 bar. The valve is designed so as to compensate the effort resulting from the pressure of the fluid against the moving closing element. The valve body is made of steel, more particularly of self-tempering steel with nickel, chrome and molybdenum. This document teaches that the body can be subject to an autofrettage treatment at a pressure of 10 000 bar for conferring a better mechanical behavior and a better dimensional stability. This teaching does not specify the type of applications to which the valve is directed and does not therefore address the problem of cyclic load. This teaching does not therefore provide a solution to the problem of cyclic pressure tests, in particular in connection with materials that are light and easy to machine, like aluminum, copper or brass.

Prior art patent document published DE 10 2009 000 538 A1 discloses the body of a connector for high pressure applications, in particular for applications in "common rail" diesel injection systems in combustion engines. The pressure in such systems is usually of above 1 000 bar. The connector is preferably made of stainless steel and is subject to an autofrettage treatment at a pressure of up to 15 000 bar. This treatment is intended to compensate the negative effect of stress concentrations in the sharp edges of bore intersections. There is however no mention of a resulting better behavior in fatigue in connection with a certain number of cycles.

SUMMARY OF INVENTION

Technical Problem

The invention has for technical problem to provide a valve body with an improved behavior to cyclic pressure testing. More particularly, the invention has for technical problem to provide a valve body made of a light material and able to satisfy cyclic pressure tests so as to show an improved behavior to fatigue.

Technical Solution

The invention is directed to a method for improving the mechanical behavior of the body of a gas valve, the body comprising at least two bores and at least one bore intersection defining an internal volume; characterized in that the method comprises the following step: subjecting the internal volume to an autofrettage treatment by applying a pressure comprised between 100 MPa and 500 MPa by means of a liquid.

According to a preferred embodiment of the invention, the autofrettage pressure is comprised between 50% and 200% of the yield strength of the material of the valve body, preferably between 80% and 180%, more preferably between 100% and 150% of the yield strength of the material of the valve body.

According to a preferred embodiment of the invention, the valve body is made of aluminum, preferably wrought aluminum, more preferably aluminum of the 6000 series according to the International Alloy Designation System. More particularly the material of the valve body can be AW-6082-T6 aluminum.

According to a preferred embodiment of the invention, the valve body comprises threaded ports and the autofrettage step is preceded by a step of closing the internal volume of the valve body by screwing plugs on said ports. Preferably, each bore has a threaded port. The threads of the bores are preferably female threads. The thread or at least one of the threads can be a male thread.

According to a preferred embodiment of the invention, after the autofrettage step, the valve body is assembled by screwing in each of the connecting ports a final element with a corresponding thread, each of the plugs being configured so that its thread engages the same turns of the thread of the corresponding connecting port as the final element.

According to a preferred embodiment of the invention, the autofrettage step is carried out by means of a pipe connected to one of the plugs screwed on the ports of the valve body, said plug comprising a passage connecting the pipe with the internal volume of said body.

According to a preferred embodiment of the invention, the autofrettage pressure is comprised between 180 MPa and 400 MPa.

According to a preferred embodiment of the invention, the bore portions adjacent to the intersection(s) have an at least essentially constant diameter, preferably on a length of at least 100%, preferably 120%, more preferably 150% of said diameter.

According to a preferred embodiment of the invention, the autofrettage step is applied during a period of time of less than 10 seconds, preferably less than 5 seconds, more preferably less than 3 seconds.

According to a preferred embodiment of the invention, during the autofrettage step, the valve body is at least essentially free of application of external forces.

According to a preferred embodiment of the invention, the diameter of the bores at the intersection(s) is comprised between 1 mm and 20 mm, preferably between 2 mm and 15 mm, more preferably between 3 mm and 8 mm, even more preferably between 4 and 7 mm.

The invention is also directed to a gas valve body comprising at least two bores and at least one bore intersection defining an internal volume with an internal wall with compressive stresses at the intersection or at least one of the intersections, these stresses preferably resulting from a treatment by autofrettage.

According to a preferred embodiment of the invention, the compressive stresses are present on a thickness of at least 0.5 mm, preferably at least 1.0 mm, more preferably at least 1.5 mm. Preferably the compressive stresses are present on a thickness of maximum 5 mm, more preferably 3 mm, even more preferably 2 mm. The compressive stresses are the normal stresses perpendicular to the possible crack plane at the maximum operating pressure after the autofrettage process.

According to a preferred embodiment of the invention, the bore intersection or at least one of the bore intersections forms an edge, the compressive stresses being present in the internal wall along said edge.

According to a preferred embodiment of the invention, the compressive stresses in the internal wall progressively decrease with increasing distance from the edge. Preferably the compressive stresses are present only at a maximum distance of 10 mm, more preferably 8 mm, even more preferably 5 mm from the edge.

According to a preferred embodiment of the invention, the compressive stresses in the internal wall progressively decrease with increasing distance from the surface of the internal wall towards the exterior of the valve body.

According to a preferred embodiment of the invention, the compressive stresses are of at least 50 MPa, preferably 100 MPa, more preferably 200 MPa.

The invention is also directed to a gas valve comprising a valve body, said body being in accordance with the invention.

According to a preferred embodiment of the invention, the valve body comprises: a first bore for a gas inlet; a second bore intersecting the first bore and receiving a movable shut-off device; and a third bore for a gas outlet, intersecting the second bore.

According to a preferred embodiment of the invention, each of the first, second and third bore comprises a thread. The thread(s) can be female or male thread(s).

According to a preferred embodiment of the invention, the thread has a diameter that is at least three times greater than the diameter of the bore at the intersection with another one of the bores.

According to a preferred embodiment of the invention, the first bore is at least generally perpendicular to the second bore and/or the second bore is at least generally perpendicular to the third bore.

According to a preferred embodiment of the invention, the second bore comprises a seat cooperating with the movable shut-off device.

Advantages of the Invention

The invention is particularly interesting in that it significantly improves the fatigue mechanical behavior of the valve body. The invention is also particularly interesting in that it provides a light valve body that is able to sustain a high number of pressure cycles and thereby compatible for hydrogen applications under high pressures, i.e. above 300 bar.

DESCRIPTION OF AN EMBODIMENT

Figure 1:
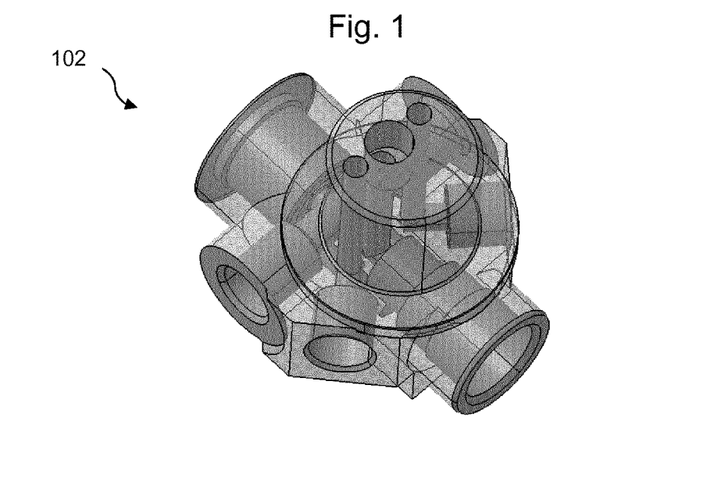
FIG. 1 depicts a valve body with a several ports, bores and bore intersections.
Figure 2:
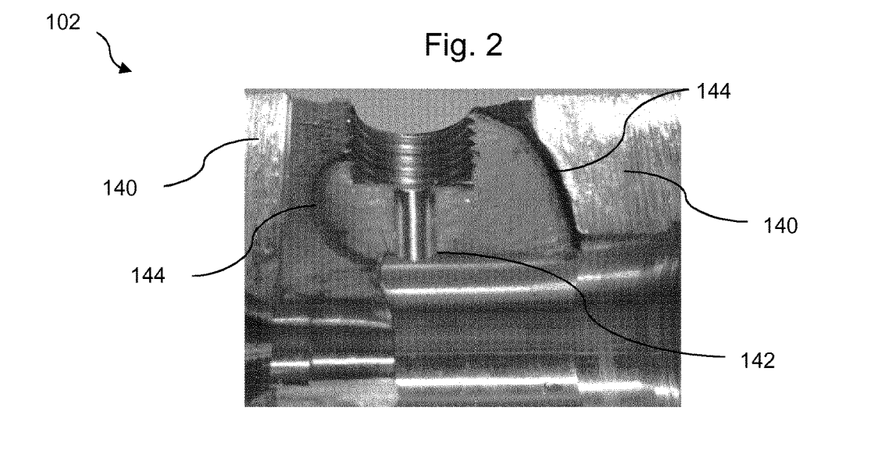
FIG. 2 is a picture of a cut in a valve body similar to the one of FIG. 1, the cut portion showing a crack due to hydraulically fatigue testing.

FIG. 1 illustrates the body of a valve for gas under high pressure, e.g. typically above 200 bar, more particularly above 500 bar. This body 102 is a single piece of metal that can be made by forging and machining. The metal can be steel, steel alloys, aluminum or brass. The body comprises a series of bores that form connection ports and that intersect with each other to create gas passages through the body. Some of the ports are used as inlet(s) and outlet(s) whereas others can be used as mounting means for movable elements like a shut-off valve, a pressure reducer or other safety devices FIG. 2 depicts a cut 140 in a valve body 102 after having undergone a cyclic pressure testing. The material is aluminum of the 6000-series, more particularly is can be an AW-6082-T6 aluminum. Many bore intersections in this aluminum valve body cause high stress concentrations due to the internal pressure. According to testing guidelines, the valve has to withstand a maximum static test pressure of 105 MPa and a cyclic hydraulic pressure test of N=150,000 cycles with a cyclic pressure loading of 87.5 MPa (stress ratio R=min stress/max stress=0). After less than 100,000 cycles with a pressure range of 0-87.5 MPa (R=0), deep cracks occurred, starting from the rectangular bore intersection 142 (crack initiation) and leading to high stress concentration. The cracks did propagate until the crack tips 144.

To overcome this difficulty, a process of autofrettage according to the invention has been set up resulting in a correct design where far more than 150,000 pressure cycles became possible.

Figure 3:
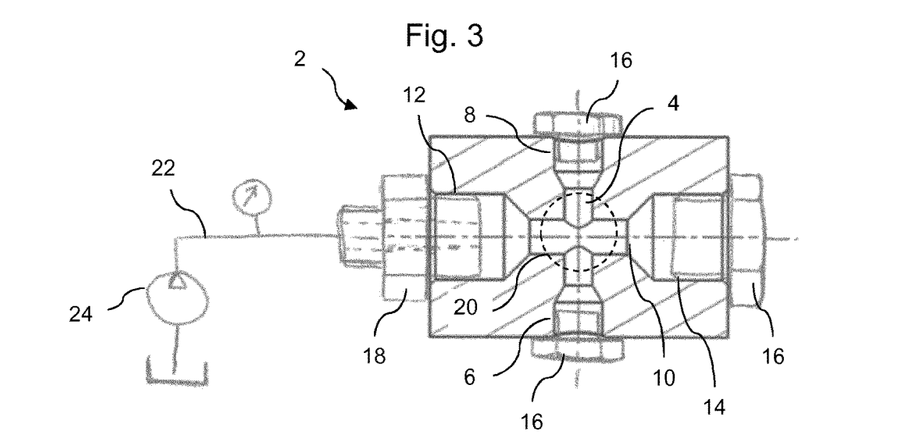
FIG. 3 is an illustration of an autofrettage treatment to a valve body, in accordance with the invention.

FIG. 3 illustrates the autofrettage process according to the invention. The valve body 2 visible in FIG. 3 is of a simplified designed for the sake of clarity, being understood that the body can be of a much more complex design. It can for example be of the design of the valve body of FIG. 1. The valve body 2 comprises two bores 4 and 10 that each cross the body and intersect each other in a central region of the body. The first bore 4 forms the threaded ports 6 and 8 whereas the second bore 10 forms the threaded ports 12 and 14. In the present example, the body 2 comprises therefore four ports which can correspond to inlet(s), outlet(s) and/or auxiliary ports. To apply an autofrettage treatment to the bore intersection area 20, the internal volume of the valve body 2 is closed by mounting plugs 16 and 18 on the threaded ports 6, 8, 12 and 14. The plug 18 comprises a passage for connecting a pipe 22 and a pump 24 whereas the other plugs are closed ones. The internal volume thereby delimited in the body is filled with a liquid, in particular a lubricating oil; this liquid being set under pressure by a pump 24 so as to achieve a pressure preferably comprised between 100 MPa and 500 MPa during a short period of time, e.g. less than 10 seconds, preferably less than 5 seconds, more preferably less than 3 seconds. This period of time can be greater than 0.5 second. The body 2 is left free of external forces except of course the natural gravity and a possible limited effort by the pipe 22. This means that the pressure in the internal volume of the body, comprising the bore intersection area 20 will be subject to compressive forces. The internal wall of the bores is therefore subject to those compressive forces. These forces are essentially oriented radially. The plugs 16 and 18 are also subject to forces resulting from the pressure inside the body, these forces being oriented essentially in the axial directions of the ports. The threads of the plugs and of the ports are therefore subject to axial forces oriented outwardly.

The autofrettage operation has for effect to plastically deform the first wearing turn(s) of the threads on the valve body. More particularly, the circular rip that forms the thread is bended by the action of the corresponding male thread on the plug having usually a much higher mechanical strength. The internal pressure resulting from the autofrettage operation exerts on the plugs axial forces that are transmitted to the body by their threaded engagement with the body. The first wearing turn(s) (from inside the body) of the female threads of the body is/are therefore subject to bending with some plastic deformation at the root of the rib. After release of the autofrettage pressure, the rib can elastically partially bend backwards and generate compressive stresses at the plastic deformation zone. These residual compressive stresses lower the stress variation when applying cyclic pressures to the body, resulting in an improved behavior in fatigue. The autofrettage has therefore for effect to shift the mean stress value to lower or negative values without changing the stress amplitude for a cyclic loading. In addition, it provides a redistribution of stresses in the threads occurred. Thus, the most critical first wearing turn(s) of the female thread shows a reduced stress amplitude and the fatigue resistance is improved so that the complete valve body can better withstands high number of cycles for the mentioned cyclic pressure range. The above phenomenon applies also to a male thread.

The small radius values at the bottom of the thread, which also mean sharp notches, lead to locally high stress values. The thread can therefore be also a weak zone of the body where cracks potentially leading to rupture can appear.

The pump 24 can be a manual one with a limited stroke so as to be able to achieve the above mentioned autofrettage pressure. Alternatively, the pump can be an electric one.

The effect of the autofrettage will be explained more in details in combination with FIGS. 4 to 7.

Figure 4:
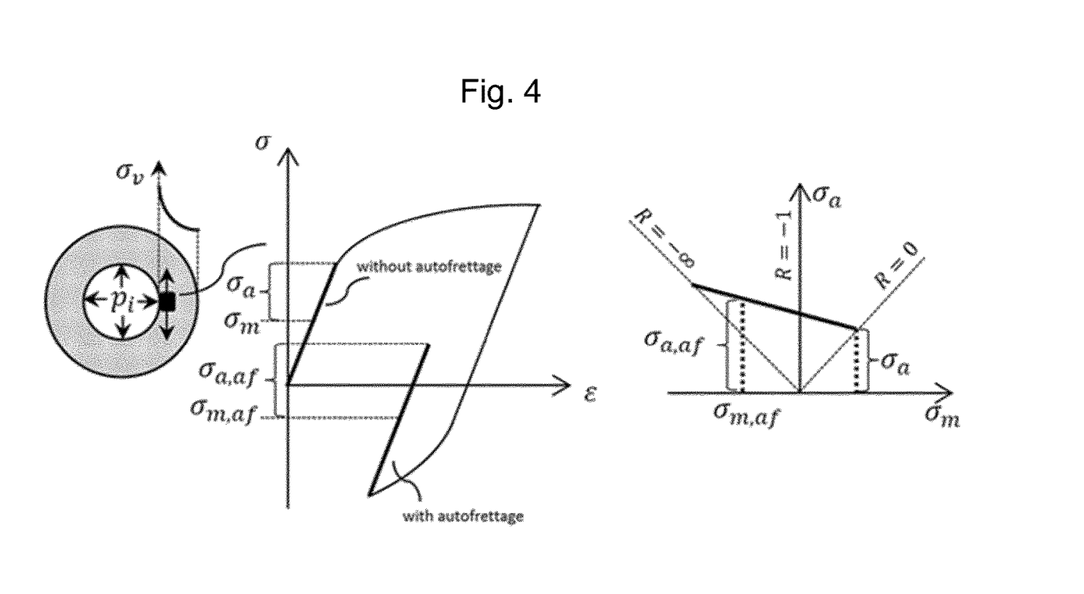
FIG. 4 illustrates the stress and strain evolution inside a bore subject to an autofrettage treatment. The left part illustrates a body in the form of a thick walled tube under internal pressure; the central part illustrates the local stress-strain path at the inner wall of the body; and the right part is a schematic illustration in the Haigh-diagram.

FIG. 4 illustrates the stress and strain evolution inside a bore subject to an autofrettage treatment. While using the autofrettage process, a very high static autofrettage pressure of several hundred MPa is applied once to the inner surface of the bore. The critical inner layer with locally high circumferential stresses on the thick-walled body is plastically deformed. While discharging to $p_i=0$, these plastically deformed parts are set under residual compressive stress by the outer layers of the tube, which were only elastically charged. In FIG. 4, on the left part we can see the elastic stress distribution in the wall during the application of internal pressure. When the autofrettage pressure is applied and later released, this inner point is strained above the yielding point. It is later shifted into the compression zone by the outer zones of the tube, which are only elastically stressed due to the steep stress gradient, which can be seen on the left part. At the middle part of FIG. 4, $\sigma_m$ and $\sigma_a$ are an example for a permitted stress mean and amplitude value without autofrettage, whereas $\sigma_{m,af}$ and $\sigma_{a,af}$ symbolize the same permitted stress values after autofrettage. The permitted amplitude is dependent on the mean value $\sigma_m$, which can also be seen in the HAIGH-diagram on the right part of FIG. 4, which shows the endurance limits as a function of the mean stress $\sigma_m$.

Hence autofrettage can be used to shift the mean stress from $\sigma_m=\sigma_a$ (R=0) to negative values. This technique does not only work for a plain thick-walled tube, but also for complex intersecting bores in a valve body.

Figure 5:
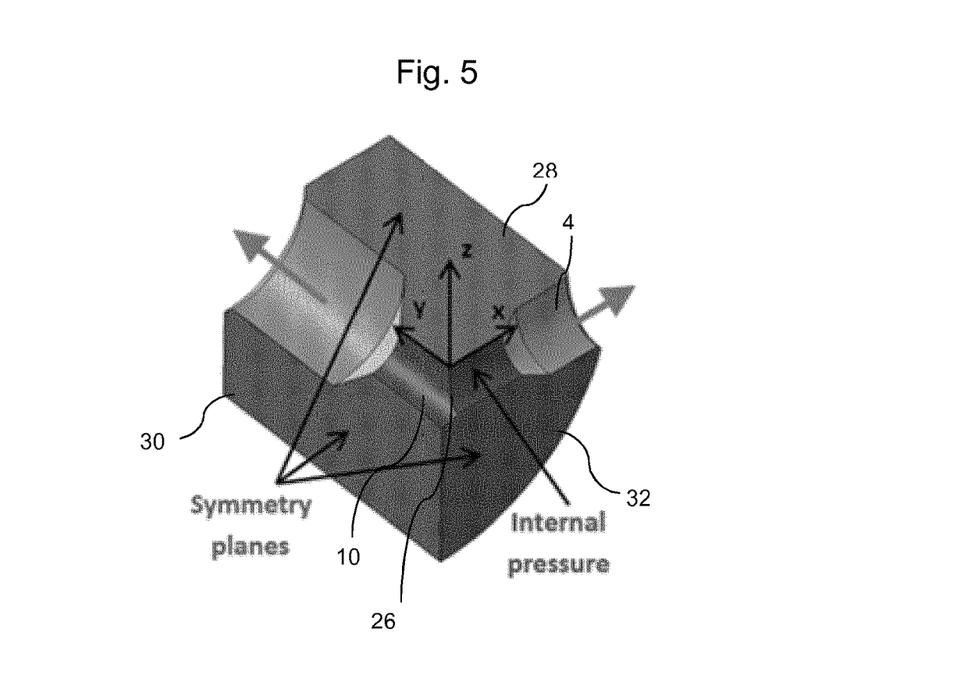
FIG. 5 illustrates a portion of the valve body comprising an edge of the bore intersection, with coordinates.

FIG. 5 illustrates a portion of the valve body of FIG. 3, more particularly a portion corresponding to an eight of the valve body 2 of FIG. 3. FIG. 5 is a representation in perspective of the portion of the valve body 2. The portion comprises three cut faces 28, 30 and 32 that are perpendicular to each other. The coordinates x-y-z are centered at the intersection of the edge 26 and the cut face 28. The axis x is oriented in the direction of the bore 4, the axis y is oriented in the direction of the bore 10 and the axis z is perpendicular to the x-y plane.

During a hydraulic cyclic pressure test at room temperature, the test body failed after 156,000 cycles (with a pressure difference Δp=0-87.5 MPa and with a factor R=min stress/max stress=0) at the metallic tightening cone due to large cracks. After testing, the specimen was saw cut and clearly showed cracks similar to those illustrated in FIG. 2.

The same body has been treated by autofrettage in accordance with the invention, with a pressure of 180 MPa. The normal stress $\sigma_N$ distribution perpendicular to the potential crack plane (28 in FIG. 5) within the local coordinates x and y for the maximum operating pressure has been obtained in a non-linear finite element calculation.

Figure 6:
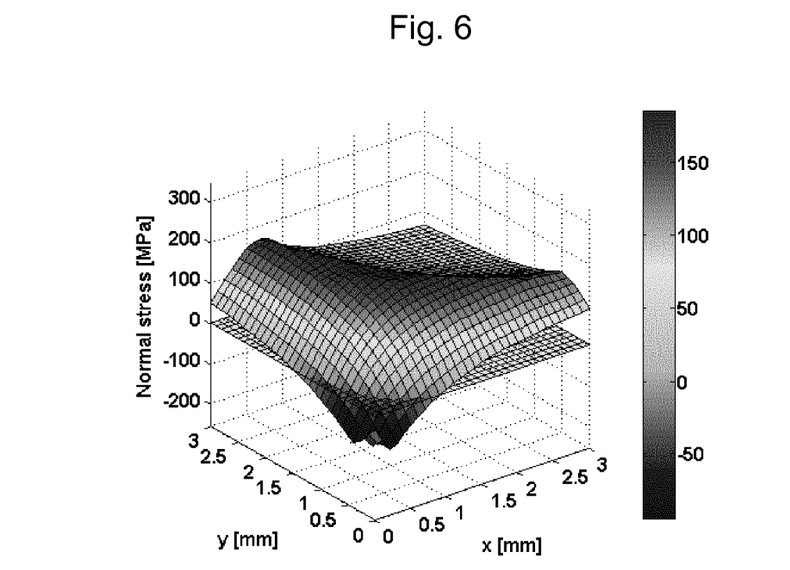
FIG. 6 illustrates the normal stress distribution perpendicular to the possible crack plane according to the coordinate in the valve body of FIG. 5, the stress normal distribution at the maximum operating pressure after the complete removal of the internal autofrettage pressure, resulting from an autofrettage treatment at a pressure of 180 MPa.

FIG. 6 illustrates the results of the calculation, showing that a small volume at the tip has negative stresses. We can observe that the compression zone has a depth of about 0.2-0.6 mm. This may mean that a crack could start nearby or the surface roughness is too high that this zone would be deep enough. The experiment has however shown interesting results with partly irregular crack growth at the four notches. However, it should be noted that the number of cycles prior to complete failure could already be increased to 368,000 cycles.

Figure 7:
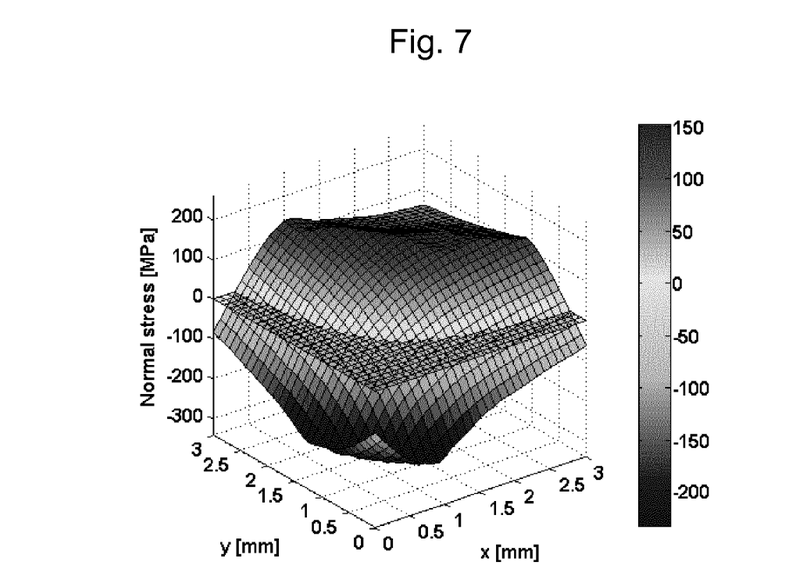
FIG. 7 is similar to FIG. 6 and illustrates the stress distribution resulting from an autofrettage treatment at a pressure of 270 MPa.

The same body has been treated by autofrettage in accordance with the invention with a pressure of 270 MPa. Similarly to the above treatment at 180 MPa, the normal stress $\sigma_N$ distribution perpendicular to the potential crack plane (28 in FIG. 5) within the local coordinates x and y for the maximum operating pressure has been calculated and is illustrated in FIG. 7. The volume under compression is significantly larger while the thickness of this layer is more than 1 mm at the notch and reaches 0.3 to 0.5 mm in the bores. This effect could also be seen in the experimental results as, after $10^6$ cycles, the specimen showed only very small cracks.

Figure 8:
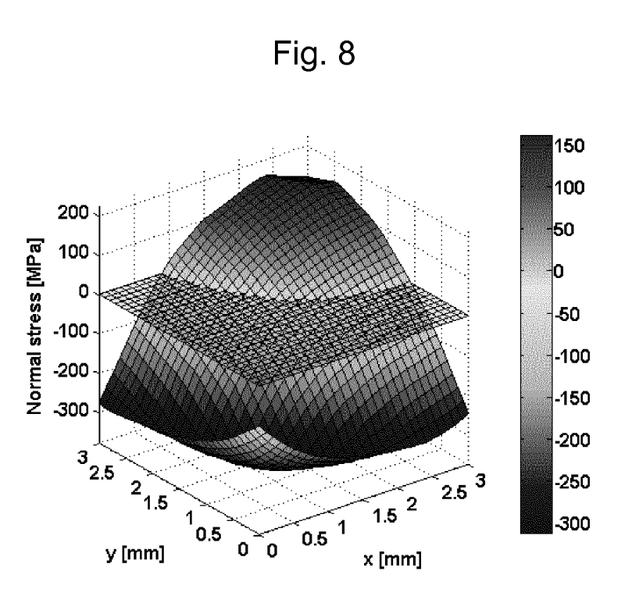
FIG. 8 is similar to FIGS. 6 and 7 and illustrates the stress distribution resulting from an autofrettage treatment at a pressure of 350 MPa.

The same body has been treated by autofrettage in accordance with the invention with a pressure of 350 MPa with a maximum total equivalent strain of about 5% at the notch. Similarly to the above treatments at 180 MPa and 270 MPa, the normal stress $\sigma_N$ distribution perpendicular to the potential crack plane (28 in FIG. 5) within the local coordinates x and y for the maximum operating pressure has been calculated and is illustrated in FIG. 8. As the materials' fracture strain $A_g$ is more than 10%, no initial crack is introduced during the autofrettage and, even after 1 million cycles, only small fatigue cracking occurred. The simulation shows a reasonable volume under compression even in the third load step (LS 3) with a depth between 1 mm and 2 mm. This test was also stopped after $10^6$ cycles and the sample opened and, just the same as with the autofrettage pressure of 270 MPa, only small cracks became visible.

Generally speaking, tests with simplified aluminum specimens under an internal cyclic pressure show quick crack growth. This behavior changed after autofrettage and significantly improved durability was shown. The specimens reached $10^6$ cycles with only very small cracks. Hence autofrettage according to the invention shows a very interesting potential. To determine the maximum autofrettage pressure at the critical notch, a criterion "strain level somewhat below the material's fracture strain" during autofrettage was used within a non-linear finite element analysis. The minimum autofrettage pressure should be such that a reasonable volume with a thickness of some tens of millimeters or some millimeters is under compression in the potential crack plane. The above described method was successfully applied to aluminum test specimens and more than 1 Million cycles were also reached with Δp=0-87.5 MPa, i.e. with a factor R=0.

The invention claimed is:

1. A method for improving the mechanical behavior of treatment of a body with threaded ports of a gas valve, comprising:
    providing at least two bores in the body and at least one bore intersection defining an internal volume;
    closing the internal volume of the valve body by screwing plugs on the threaded ports, respectively; and
    subjecting the internal volume to an autofrettage by applying a pressure of a value between 100 MPa and 500 MPa by means of a liquid, for improving the mechanical behavior of said body;
    wherein a diameter of the at least two bores at the at least one bore intersections is between 1 mm and 20 mm; and
    wherein the threads of the threaded ports have each a diameter delimiting a cross-section of the corresponding plug that is subject to the pressure of autofrettage, said diameter being at least three times greater than a diameter of the at least two bores at the at least one bore intersection.

2. The method according to claim 1, wherein the body is made of aluminum of the 6000 series according to the International Alloy Designation System.

3. The method according to claim 1, wherein after the autofrettage step, the body is assembled by screwing, in each of the threaded ports, respectively a final element with a thread that corresponds to said threaded port, each of the plugs being configured so that its thread engages the same turns of a thread of the threaded port to which said plug is screwed, as the corresponding final element.

4. The method according to claim 1, wherein the pressure of autofrettage is between 180 MPa and 400 MPa.

5. The method according claim 1, wherein portions of the at least two bores that are adjacent to the intersection have a constant diameter at one of the following lengths relative to the diameter:
    at least 100%;
    at least 120%; and
    at least 150%.

6. The method according to claim 1, wherein the pressure of autofrettage step is applied during one of the following periods of time:
    less than 10 seconds;
    less than 5 seconds; and
    less than 3 seconds.

7. The method according to claim 1, wherein a diameter of the at least two bores at the at least one bore intersection is between one of the following ranges:
    2 mm and 15 mm;
    3 mm and 8 mm; and
    4 mm and 7 mm.

8. The method according to claim 1, wherein the threads of the threaded ports have a diameter that is at least three times greater than a diameter of the at least two bores at the at least one bore intersection.

9. The method according to claim 1, wherein the autofrettage step is carried out by means of a pipe connected to one of the plugs screwed on the threaded ports of the body, the plug comprising:
    a passage connecting the pipe with the internal volume of the body.

10. The method according to claim 9, wherein during the autofrettage step, the body is free of application of external forces with exception of natural gravity and a possible effort by the pipe.

11. The method according to claim 1, wherein:
    the at least two bores and at least one bore intersection define an internal volume with an internal wall; and
    the internal wall is treated by autofrettage, resulting in compressive stresses at the at least one bore intersection.

12. The method according to claim 11, wherein the compressive stresses are present on one of the following maximum thicknesses:
    at least 0.5 mm;
    at least 1.0 mm; and
    at least 1.5 mm.

13. The method according to claim 11, wherein the compressive stresses in the internal wall progressively decrease with increasing distance from the surface of the internal wall towards the exterior of the valve body.

14. The method according to claim 11, wherein the compressive stresses are of at least one of the following:
    50 MPa;
    100 MPa; and
    200 MPa.

15. The method according to claim 11, wherein the at least one bore intersection forms an edge, the compressive stresses being present in the internal wall along the edge.

16. The method according to claim 15, wherein the compressive stresses in the internal wall progressively decrease with increasing distance from the edge.

17. A method for improving the mechanical behavior of treatment of a body with threaded ports of a gas valve, comprising:
- providing at least two bores in the body and at least one bore intersection defining an internal volume;
- closing the internal volume of the valve body by screwing plugs on the threaded ports, respectively; and
- subjecting the internal volume to an autofrettage by applying a pressure of a value between 100 MPa and 500 MPa by means of a liquid, for improving the mechanical behavior of said body;
- wherein after the autofrettage step, the body is assembled by screwing, in each of the threaded ports, respectively a final element with a thread that corresponds to said threaded port, each of the plugs being configured so that its thread engages the same turns of a thread of the threaded port to which said plug is screwed, as the corresponding final element.

* * * * *